United States Patent [19]
Akins

[11] Patent Number: 5,636,409
[45] Date of Patent: Jun. 10, 1997

[54] UNIVERSAL PISTOL GRIP FOR CAMCORDERS

[76] Inventor: John Akins, 250 Timothy Trail, Duncanville, Tex. 75137

[21] Appl. No.: 651,739

[22] Filed: May 22, 1996

[51] Int. Cl.⁶ .................................................. A47B 95/02
[52] U.S. Cl. ........................................ 16/114 R; 294/139
[58] Field of Search .............................. 16/114 R, 110.5, 16/115, DIG. 40, DIG. 41; 294/139, 146

[56] References Cited

U.S. PATENT DOCUMENTS

| | | | |
|---|---|---|---|
| 2,483,711 | 10/1949 | Roos | 294/139 |
| 2,617,142 | 11/1952 | Cadwell | 294/139 |
| 2,712,779 | 7/1955 | Tolcher | 294/139 |
| 3,437,029 | 4/1969 | Rydstedt | 294/139 |
| 5,349,497 | 9/1994 | Hanson et al. | 16/114 R |

FOREIGN PATENT DOCUMENTS

| | | | |
|---|---|---|---|
| 0039252 | 11/1981 | European Pat. Off. | 294/139 |
| 3-288838 | 12/1991 | Japan | 294/139 |

*Primary Examiner*—Chuck Y. Mah

[57] ABSTRACT

A Universal Pistol Grip for Camcorders having a rectangular mounting plate with an upward facing mounting pad. The mounting plate and pad has a elongated horizontal slot for attaching a camcorder, a securing screw that extends through and is retained in the horizontal slot. This horizontal slot with attachment screw allows horizontal adjustment for the rigid grip. The rigid grip is attached to the mounting plate by a bolt. This bolt has a flat top recessed in a countersunk hole in the mounting plate. The bolt extends through a hole in the solid portion of the rigid grips top. A nut in the hollow portion of the rigid grip secures the plate to the grip. This attachment allows the plate to swivel 180 degrees on the grip. The plate can be secured in the preferred position by tightening the securing nut. The elongated downward extending portion of the grip is of a hollow construction. Attached to the rigid grip is a non-removable flexible handle. This flexible handle is equipped with a device for adjustment to the user's wrist. The elongated flexible handle can be stored in the hollow portion of the rigid grip. The flexible handle is retained in the rigid grip by a base plate. The base plate covers the hollow portion of the rigid grip. The base plate is equipped with a hinged opening hatch with an opening tab.

1 Claim, 1 Drawing Sheet

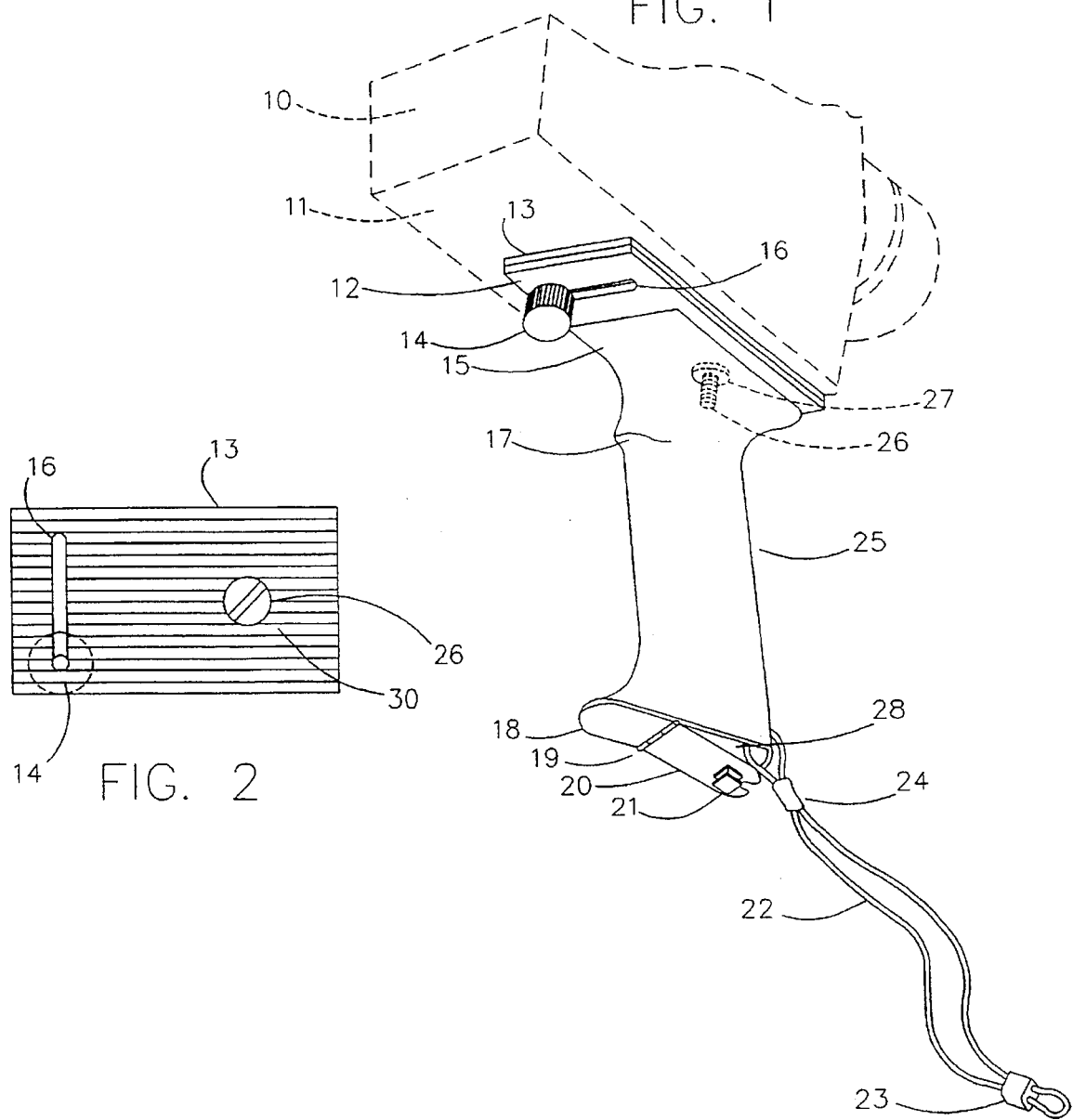

UNIVERSAL PISTOL GRIP FOR CAMCORDERS

FIELD OF INVENTION

The present invention relates to a universal pistol grip for compact camcorders and is directed particularly at providing a means of attaching a pistol grip handle that fits all camcorders.

BACKGROUND OF THE INVENTION

Manufacturers of compact camcorders place the threaded attachment inserts in different positions on the bottoms of their respective camcorders. This makes it difficult to attach a grip that will be on the center line of all brands camcorders to maintain balance. U.S. Pat. No. 2,617,142 Cadwell 1949 shows a pistol grip attachment with a mounting screw built into the grip. This design would necessitate the grip being in line with the camcorders threaded attachment insert. Some manufacturers place these inserts to the edge of the camera bottom this would place the grip to the side of the camera. U.S. Pat. No. 3,437,029 Rydstedt 1967, has prior art that shows a pistol grip with a mounting plate. The mounting plate to be attached to the camera by a screw. The screw is not an integral part of the plat and could be easily lost. The plate is designed for use with camcorders with central mounted threads inserts. When used with a camcorder with an off center attachment insert this would place the grip to the side of the camcorder. The two prior arts cited above when used with camcorders with offset attachments would be off balance. The weight of the camcorder would create stress on the wrist and promote hand and arm fatigue. All compact camcorders come from the factory with a side mounted strap handle. These factory equipped handles are mounted to be used with the right hand. The left hand has only the body of the camcorder to grasp when giving additional support. What is needed is a means of mounting a pistol grip to the camcorder that is adaptable to keep the grip on the center balance line of all camcorders regardless of the position of the attachment inserts. The present invention does all of the above in a compact easy to use package.

SUMMARY OF THE INVENTION

The principle object of the present invention is to provide a means of attaching a pistol grip handle to a camcorder using a mounting plate. The plate having adjustments to place the grip on the central balance line of all camcorders regardless of the different positioning of the attachment inserts on individual camcorders. Accordingly several objects and advantages of the present invention are:

A—To provide a grip that balances the weight camcorders reducing stress on the wrist, hand and arm.

B—To provide a grip that can be held by either the left or right hand

C—To provide a grip that when used in conjunction with the factory provided strap handle provides a natural brace, this will reduce camera shake and fatigue while filming.

D—To provide a grip with a light compact design easily maneuvered in crowded areas and still provide excellent support.

E—To provide a grip that can easily and quickly be attached to or removed from a camcorder F—To provide a grip that has a non-removable wrist strap that can be stored inside the grip when not in use.

Other objects and advantages will become apparent from a consideration of the following descriptions and drawings.

BRIEF DESCRIPTION OF THE DRAWINGS

FIG. 1 Is a perspective view of the adjustable mounting plate and pistol grip construction as it might be attached to a camcorder.

FIG. 2 is a view looking down at the top of the adjustable mounting plate, showing the hardware and construction of the mounting plate attachment to the grip.

PARTS LIST

| PART NO. # | HARDWARE DESCRIPTION |
|---|---|
| #12 | ADJUSTABLE MOUNTING PLATE |
| #13 | RIBBED MOUNTING PAD |
| #14 | CAMCORDER SECURING SCREW |
| #15 | RECTANGULAR SOLID PORTION OF RIGID HANDLE |
| #16 | MOUNTING PLATE ADJUSTABLE HORIZONTAL MOUNTING SLOT |
| #17 | FINGER POSITIONER ON RIGID HANDLE |
| #18 | BASE PLATE COVER FOR HOLLOW PORTION OF RIGID HANDLE |
| #19 | HINGE FOR BASE PLATE OPENING HATCH |
| #20 | BASE PLATE OPENING HATCH |
| #21 | BASE PLATE HATCH OPENING TAB |
| #22 | ELONGATED FLEXIBLE STRAP HANDLE |
| #23 | FLEXIBLE HANDLE ADJUSTMENT DEVICE |
| #24 | FLEXIBLE HANDLE CONNECTING CLAMPS |
| #25 | ELONGATED PORTION OF THE RIGID HANDLE |
| #26 | FLAT TOP SCREW SECURING MOUNTING PLATE TO RIGID HANDLE |
| #27 | FASTENING NUT FOR FLAT TOP MOUNTING SCREW |
| #28 | HOLLOW PORTION OF ELONGATED HANDLE |
| #30 | ACCESS HOLE IN MOUNTING PAD AND PLATE FOR CONNECTING ADJUSTABLE MOUNTING PLATE TO RIGID HANDLE |

DESCRIPTION OF THE INVENTION

Referring to drawings FIG. 1 shows a Camera 10 having a bottom surface 11. Attached to bottom surface 11 of Camera 10 by a securing screw 14 threaded into a tripod socket (not shown) is shown the adjustable pistol grip handle construction of the present invention.

The adjustable pistol grip is formed primarily of three portions, adjustable mounting plate portion 12 attaches to the camcorder, rigid grip portion 25 is rotatory movable relative to mounting plate portion 12 and elongated flexible handle portion 22 is stored inside rigid grip portion 25. Adjustable mounting plate 12 is generally rectangular. It may be constructed of any light weight rigid material with sufficient strength to support a camcorder. The upper surface of adjustable mounting plate 12 has a ribbed mounting pad 13 attached to mounting plate 12 with an adhesive. This provides a cushioning platform for the camcorder and keeps the camcorder in the preferred position. Mounting pad 13 may be constructed by a natural material such as rubber or synthetic such as plastic. Mounting plate 12 and mounting pad 13 has a horizontal adjusting slot 16 for receiving securing screw 14. Camcorder securing screw 14 is formed with the knob portion on the underside of mounting plate 12 as shown in FIG. 1. The neck of securing screw 14 extends through horizontal adjusting slot 16 and is of a diameter that lets it slide horizontally in adjustable slot 16. The threaded portion of securing screw 14 extends beyond mounting pad 13 to receive the camcorder as shown in FIG. 2. The threaded portion of securing screw 14 is of a sufficient diameter that it will not pass through horizontal slot 16. This makes securing screw 14 an integral part of mounting plate 12.

A counter sunk hole 30 goes through both mounting pad 13 and mounting plate 12 to receive a flat head screw 26 shown in FIG. 2. Flat top screw 26 secures rigid grip 25 to the bottom surface of mounting plate 12. The rigid grip portion 25 of the present invention may be constructed of any light weight material with sufficient strength to support a camcorder. Rigid grip 25 has an elongated body of hollow construction 28, a solid rectangular top portion 15 to support mounting plate 12, a raised finger positioner 17 in front for added support. The bottom of grip 25 has a base plate 18 to cover hollow grip portion 28. Base plate 18 has an opening hatch 20 that swivels on a hinge 19 and is equipped with an opening tab 21. Base plate 18 in secured to grip 25 by an adhesive. The back side of grip 25 is contoured to fit comfortably in the hand. On the back side of grip 25 near the base is a eyelet (not shown) for attachment of a non removable wrist strap 22.

Rigid grip 25 is attached to mounting plate 12 by flat head screw 26. The head of flat top screw 26 nests in counter sunk hole 30 in mounting plate 12. The body of flat top screw 26 passes through a hole (not shown) in solid portion 15 of grip 25 threading into a securing nut 27 in hollow portion 28 of rigid grip 25 as shown in phantom in FIG. 1. This construction allows mounting plate 12 to rotate 180 degrees on rigid grip 25 as necessary to be compatible with various makes of camcorders. Flexible handle 22 portion of the present invention may be formed of a natural material such as leather or a synthetic such as plastic. The strap is never the less formed of a flexible material with a thickness and strength to support a camcorder from the users wrist should they wish to use it for carrying or as a safety device should it accidentally be dropped- Wrist strap 22 is formed and attached to rigid handle 25 by inserting one end of the strap material through the eyelet in grip 25, then both ends of the strap material being clamped together by clamps 24 forming a double loop. One loop attaching strap 22 to grip 25. The other loop having a slide adjustment device 23 to adjust strap 22 to fit the users wrist. Wrist strap 22 can be stored inside hollow portion 28 of grip 25 when not in use. Base plate sections 18 and 20 retaining wrist strap 22 in position. From the foregoing it will be readily apparent that there is provided in the present invention a novel handle device for attachment of a camcorder in the manner described. Where in the construction and adjustment application will provide a support that will be on the center balance line of all camcorders regardless of the position of their threaded inserts.

I claim:

1. An adjustable pistol grip assembly adapted to be attached to a camcorder, said assembly comprising:

a generally rectangular horizontal mounting plate having two ends and an upper surface, an upward facing ribbed mounting pad attached to said upper surface, an elongated slot located at one end of said mounting plate and an access hole located at the other end of said mounting plate;

means retained in said slot for removably securing the mounting plate to a camcorder;

a rigid hand grip, said rigid hand grip comprising an elongated hollow body having a flat rectangular top end and an open bottom end defining a storage compartment, said body having a base plate at the bottom end thereof for covering the open bottom end, said base plate including a hinged opening hatch with an opening tab, said flat rectangular top end having a through hole therein;

a flexible elongated handle attached to said rigid hand grip; and wherein said rigid hand grip is attached to said mounting plate by a connecting bolt and an adjustable nut through said access hole of the mounting plate and the through hole in said top end of the rigid hand grip, thereby allowing the mounting plate to be supported by said flat rectangular top end and allowing the mounting plate to be rotated 180 degrees relative to said rigid hand grip; and wherein said flexible handle can be removably stored and retained in said compartment of said rigid hand grip by said opening hatch.

\* \* \* \* \*